United States Patent
Amari et al.

(10) Patent No.: US 10,877,341 B2
(45) Date of Patent: Dec. 29, 2020

(54) LIQUID CRYSTAL DISPLAY DEVICE AND ELECTRONIC APPARATUS

(71) Applicant: SONY CORPORATION, Tokyo (JP)

(72) Inventors: Koichi Amari, Kanagawa (JP); Takashi Sakairi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 189 days.

(21) Appl. No.: 16/069,054

(22) PCT Filed: Jan. 17, 2017

(86) PCT No.: PCT/JP2017/001406
§ 371 (c)(1),
(2) Date: Jul. 10, 2018

(87) PCT Pub. No.: WO2017/130796
PCT Pub. Date: Aug. 3, 2017

(65) Prior Publication Data
US 2020/0201129 A1    Jun. 25, 2020

(30) Foreign Application Priority Data

Jan. 26, 2016 (JP) .................... 2016-012034

(51) Int. Cl.
*G02F 1/1362* (2006.01)
*G02F 1/1333* (2006.01)
(Continued)

(52) U.S. Cl.
CPC ...... *G02F 1/136286* (2013.01); *G02F 1/1368* (2013.01); *G02F 1/13439* (2013.01);
(Continued)

(58) Field of Classification Search
CPC .......................................... G02F 2001/133388
See application file for complete search history.

(56) References Cited

U.S. PATENT DOCUMENTS

| 5,767,827 A | 6/1998 | Kobayashi et al. |
| 2004/0150782 A1* | 8/2004 | Honda .............. G02F 1/133371 349/158 |

(Continued)

FOREIGN PATENT DOCUMENTS

| JP | 06-214252 A | 8/1994 |
| JP | 08-179377 A | 7/1996 |

(Continued)

OTHER PUBLICATIONS

Office Action for JP Patent Application No. 2016-012034, dated Dec. 3, 2019, 05 pages of Office Action and 04 pages of English Translation.

(Continued)

*Primary Examiner* — Edmond C Lau
(74) *Attorney, Agent, or Firm* — Chip Law Group

(57) ABSTRACT

There is provided a liquid crystal display device that includes a first substrate including a plurality of wiring layers and having a plurality of first electrodes on one surface of the first substrate, a second substrate provided to face the first substrate and having a second electrode facing the first electrodes, and a liquid crystal layer sealed between the first substrate and the second substrate, wherein a thickness in a peripheral portion in a plane of the first substrate is larger than a thickness in a central portion.

18 Claims, 14 Drawing Sheets

(51) Int. Cl.
  *G02F 1/1335*   (2006.01)
  *G02F 1/1343*   (2006.01)
  *G02F 1/1368*   (2006.01)
(52) U.S. Cl.
  CPC .. *G02F 1/133345* (2013.01); *G02F 1/133553* (2013.01); *G02F 1/134309* (2013.01); *G02F 2001/133302* (2013.01); *G02F 2001/133388* (2013.01)

(56) References Cited

U.S. PATENT DOCUMENTS

| | | | | |
|---|---|---|---|---|
| 2005/0213000 A1* | 9/2005 | Akimoto | ........... | G02F 1/133509 349/113 |
| 2006/0170854 A1* | 8/2006 | Han | ............. | G02F 1/1339 349/153 |
| 2016/0377904 A1* | 12/2016 | Shin | ............. | G02F 1/13452 257/776 |

FOREIGN PATENT DOCUMENTS

| | | |
|---|---|---|
| JP | 2864464 B2 | 3/1999 |
| JP | 2000-194008 A | 7/2000 |
| JP | 2000-267588 A | 9/2000 |
| JP | 2001-021876 A | 1/2001 |
| JP | 2003-005202 A | 1/2003 |
| JP | 2010-097028 A | 4/2010 |

OTHER PUBLICATIONS

International Search Report and Written Opinion of PCT Application No. PCT/JP2017/001406, dated Mar. 4, 2017, 11 pages of ISRWO.

* cited by examiner

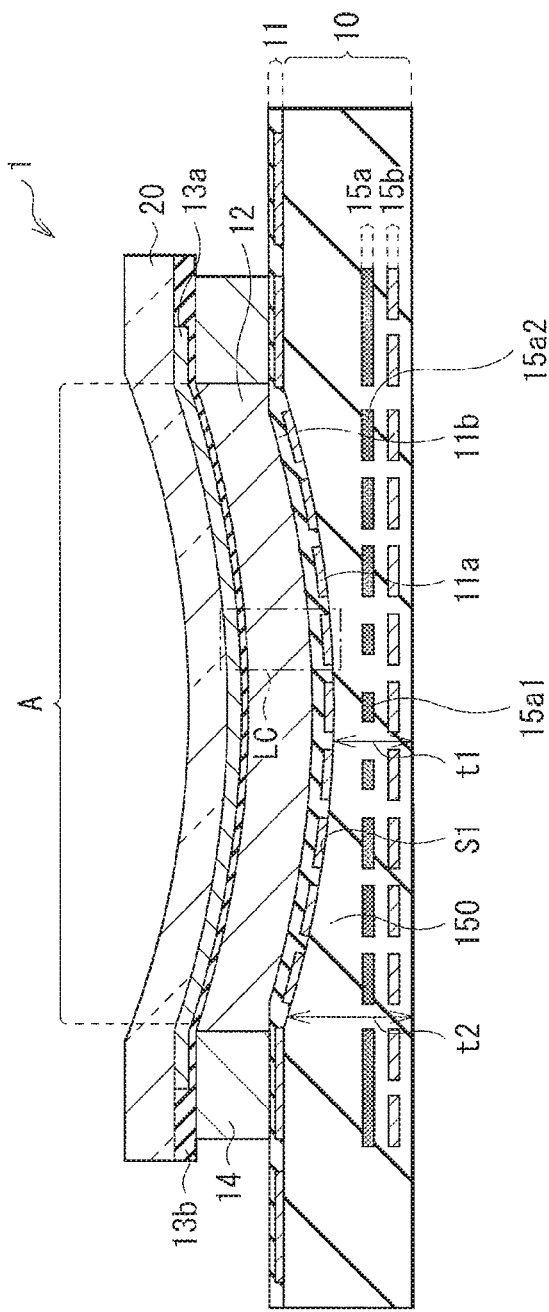
[FIG. 1]

[FIG. 2A]
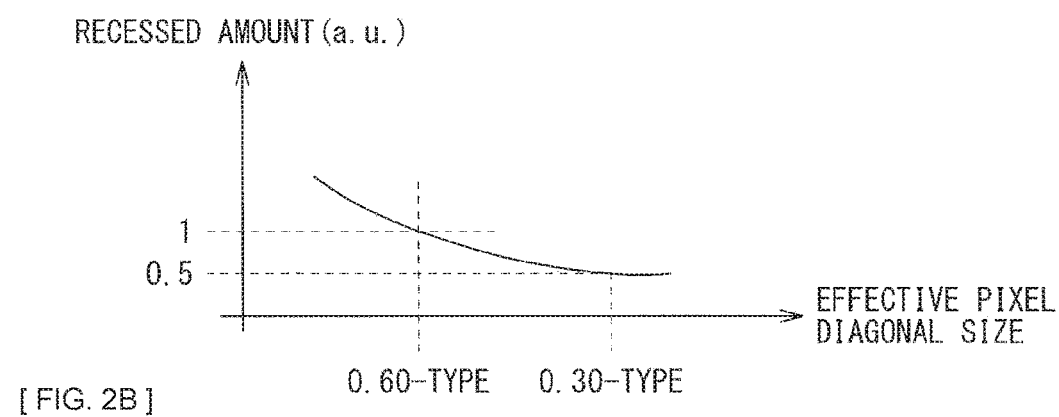
[FIG. 2B]
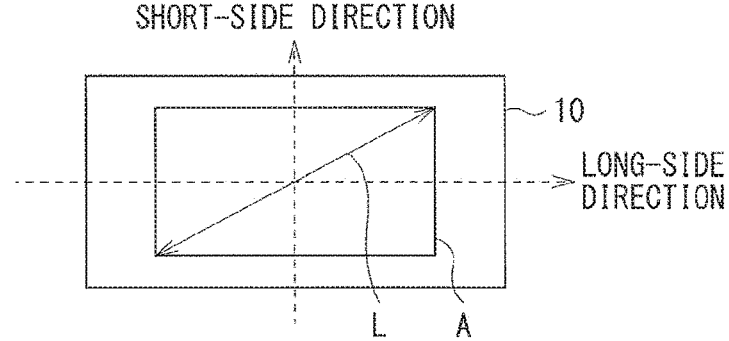
[FIG. 3]
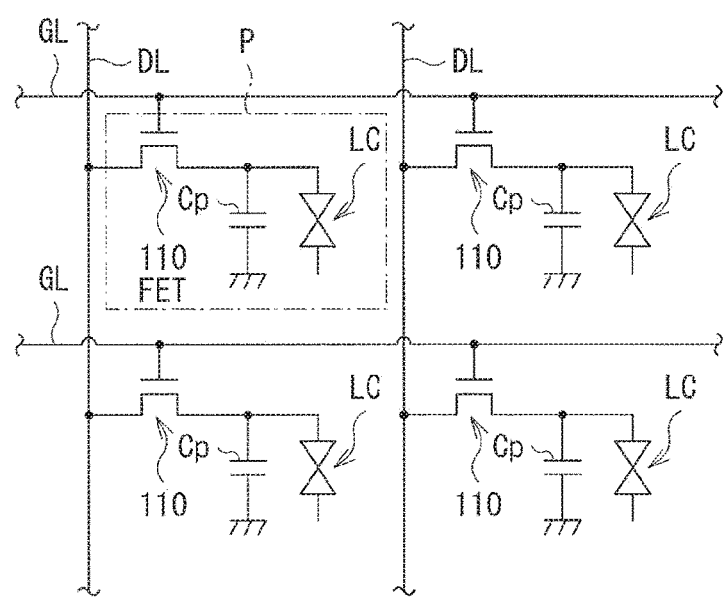

[ FIG. 4A ]
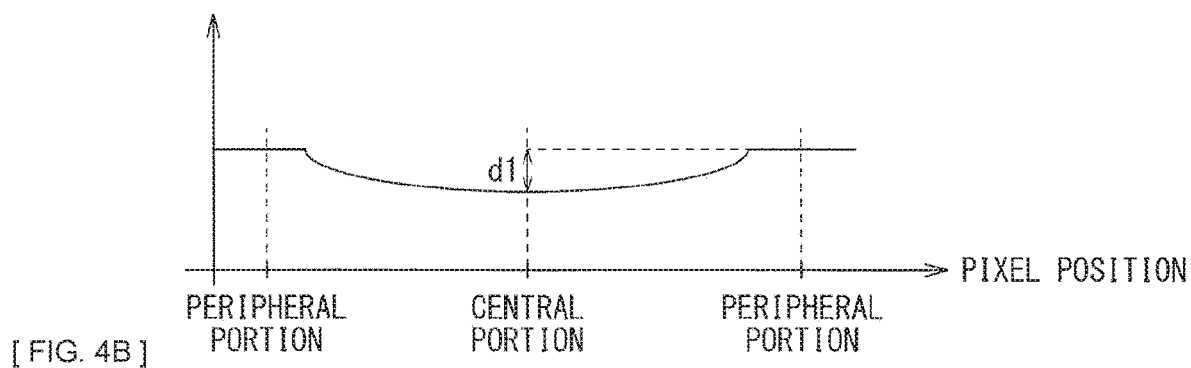
[ FIG. 4B ]
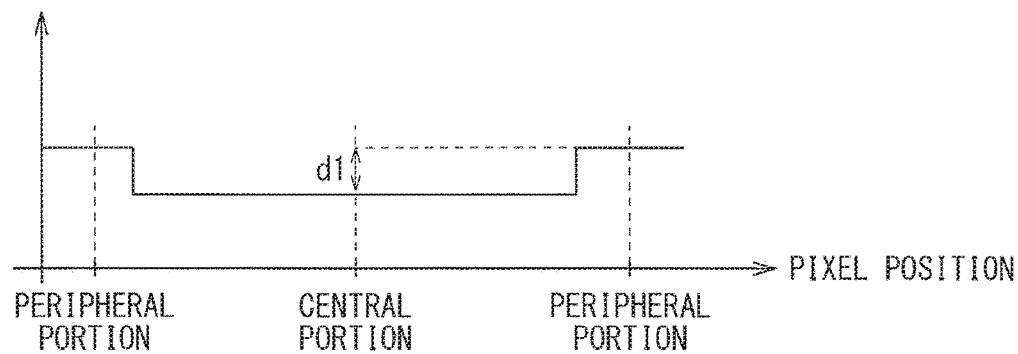
[ FIG. 5 ]
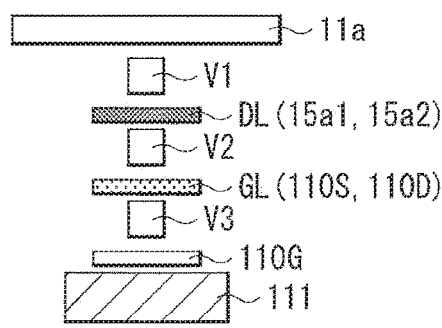

[FIG. 6]
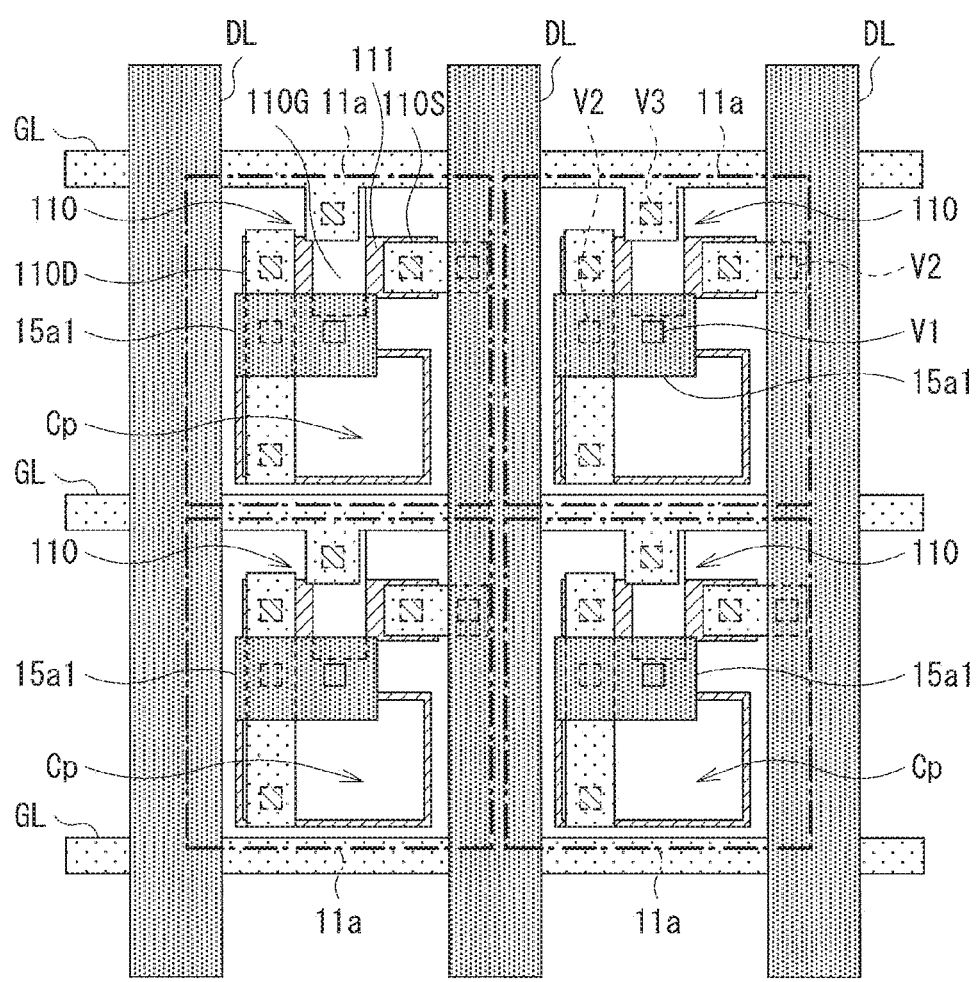

[FIG. 7]
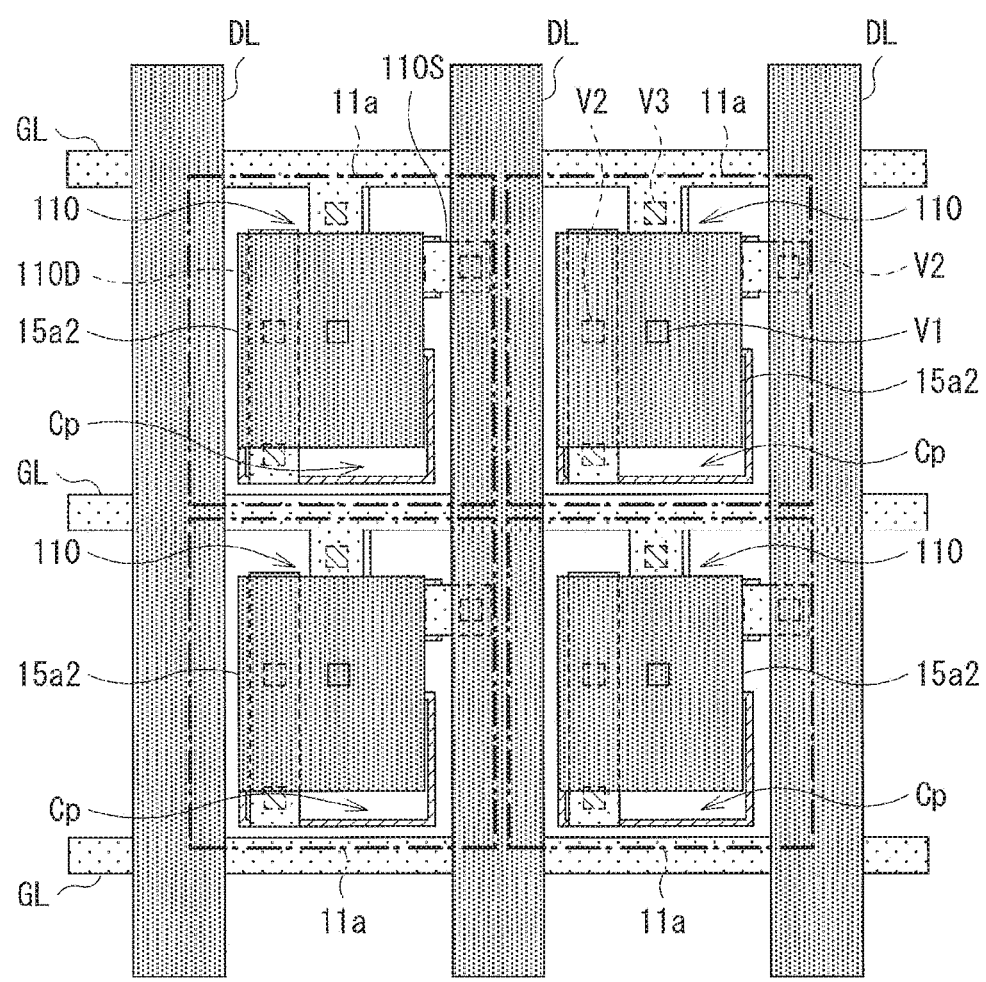

[ FIG. 8 ]
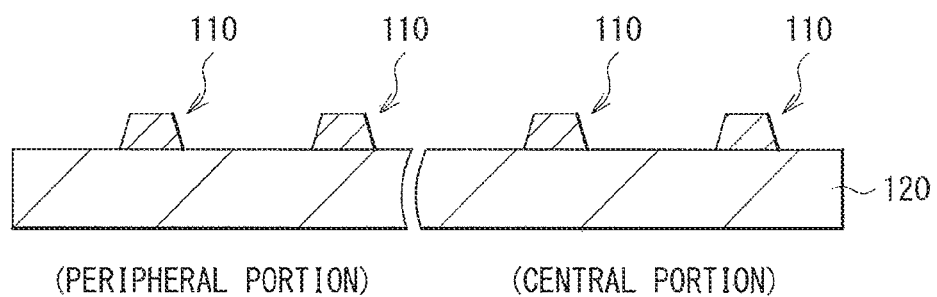
[ FIG. 9 ]
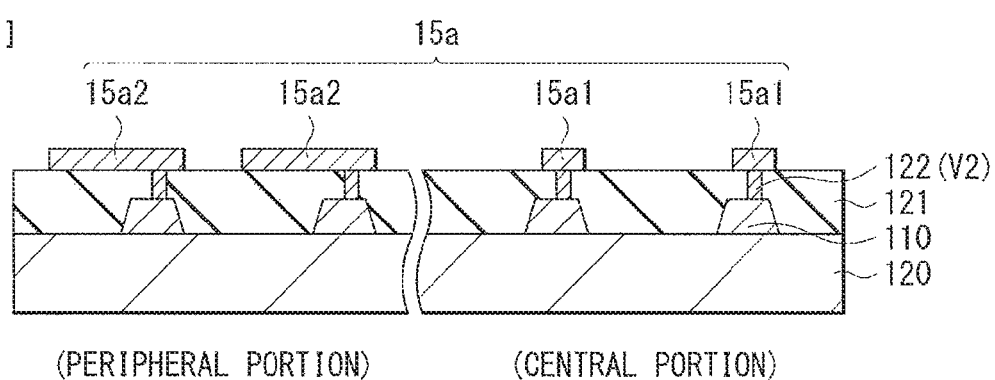
[ FIG. 10A ]
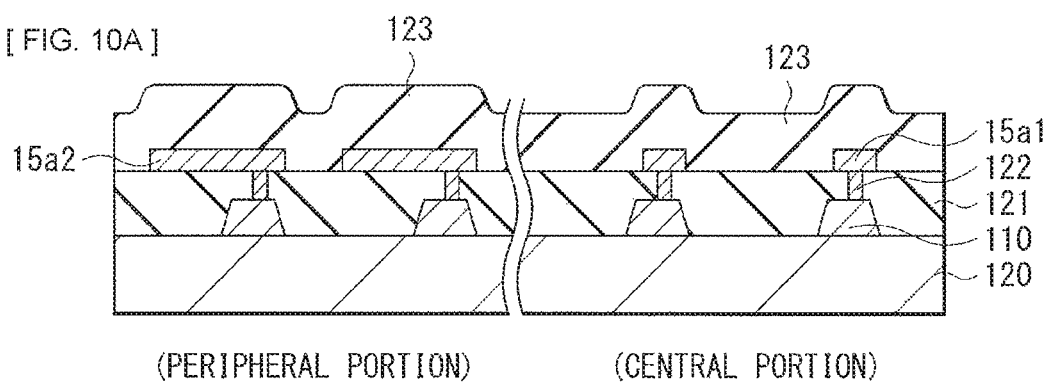

[FIG. 10B]
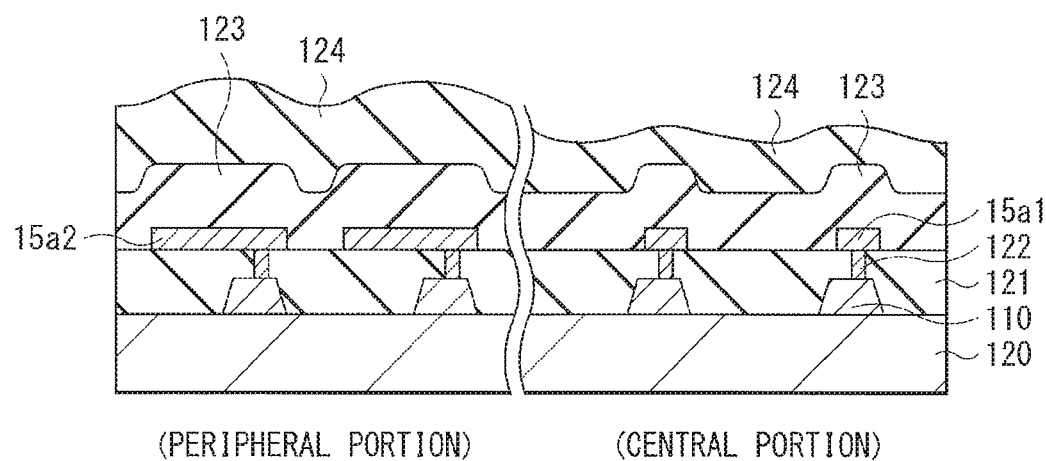
(PERIPHERAL PORTION)  (CENTRAL PORTION)
[FIG. 11]
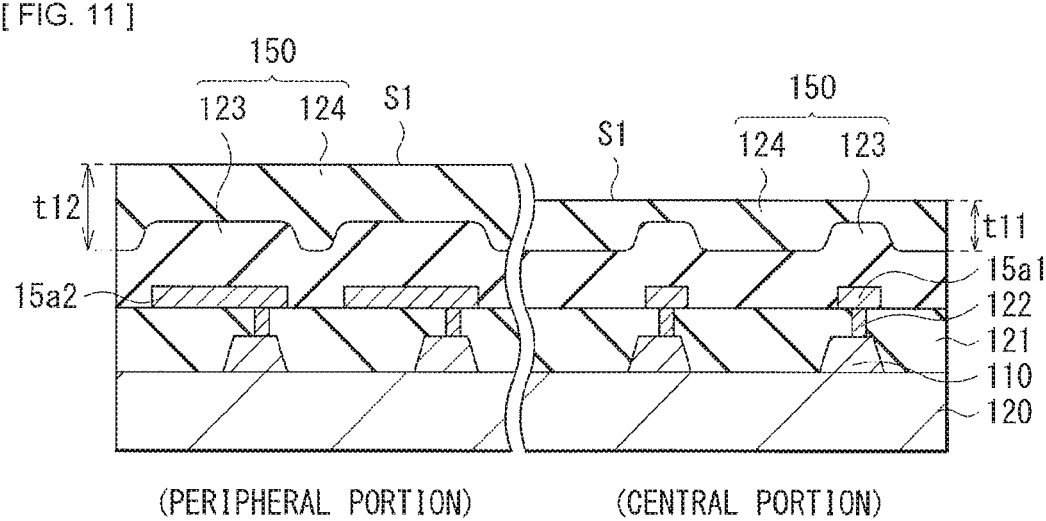
(PERIPHERAL PORTION)  (CENTRAL PORTION)

[FIG. 12]
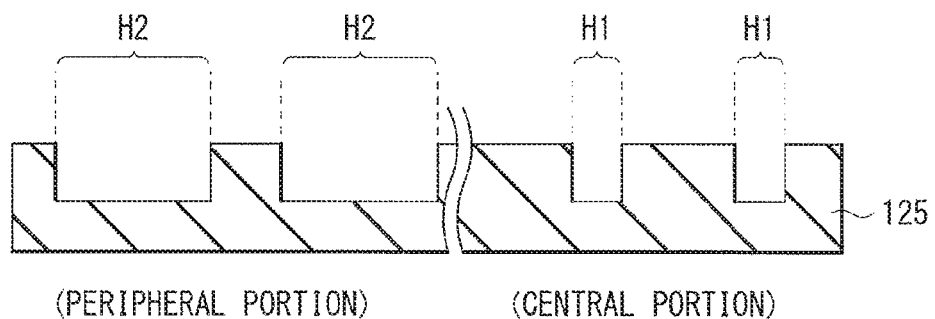
(PERIPHERAL PORTION)  (CENTRAL PORTION)
[FIG. 13]
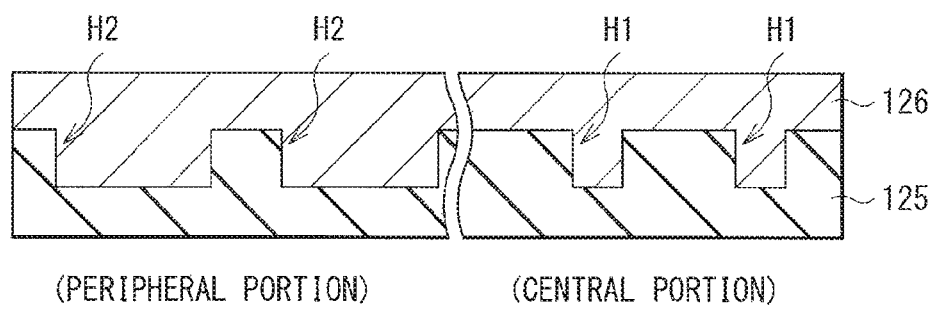
(PERIPHERAL PORTION)  (CENTRAL PORTION)
[FIG. 14]
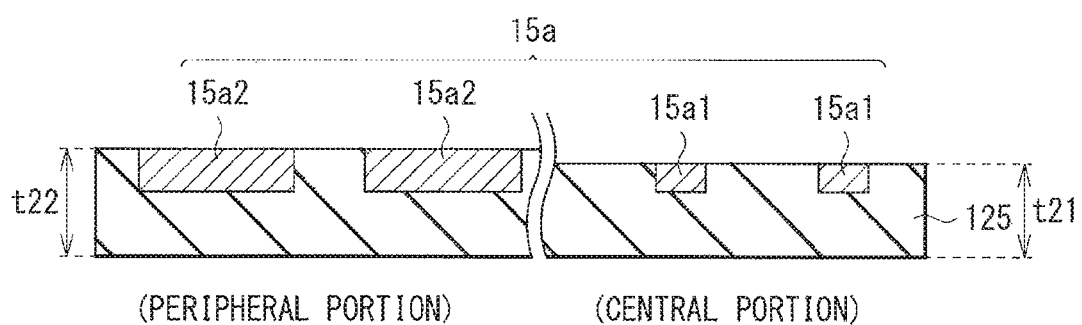
(PERIPHERAL PORTION)  (CENTRAL PORTION)

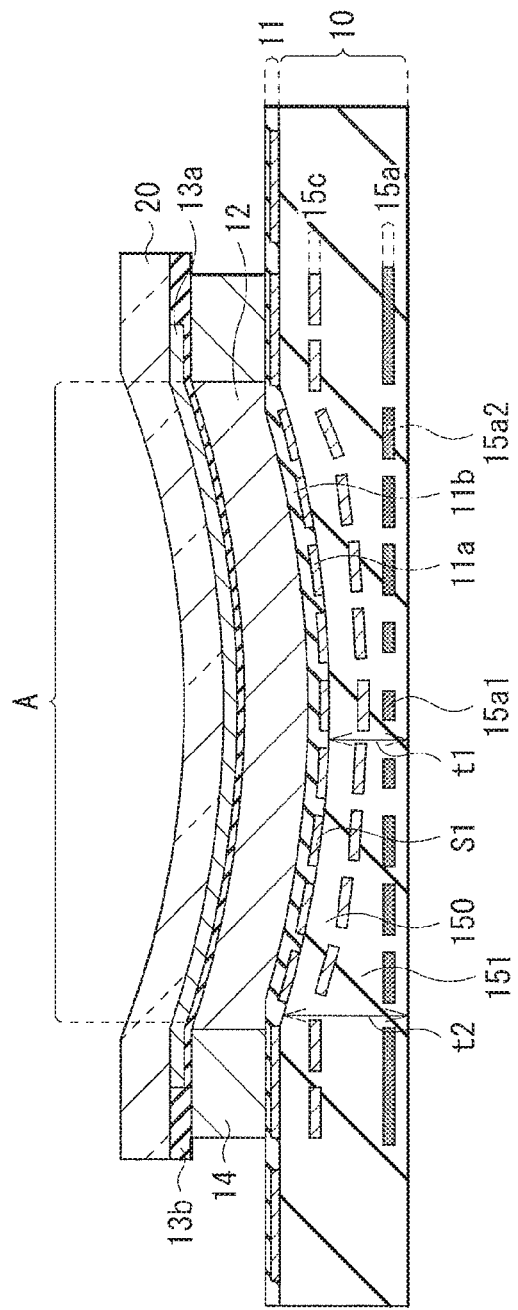
[ FIG. 15 ]

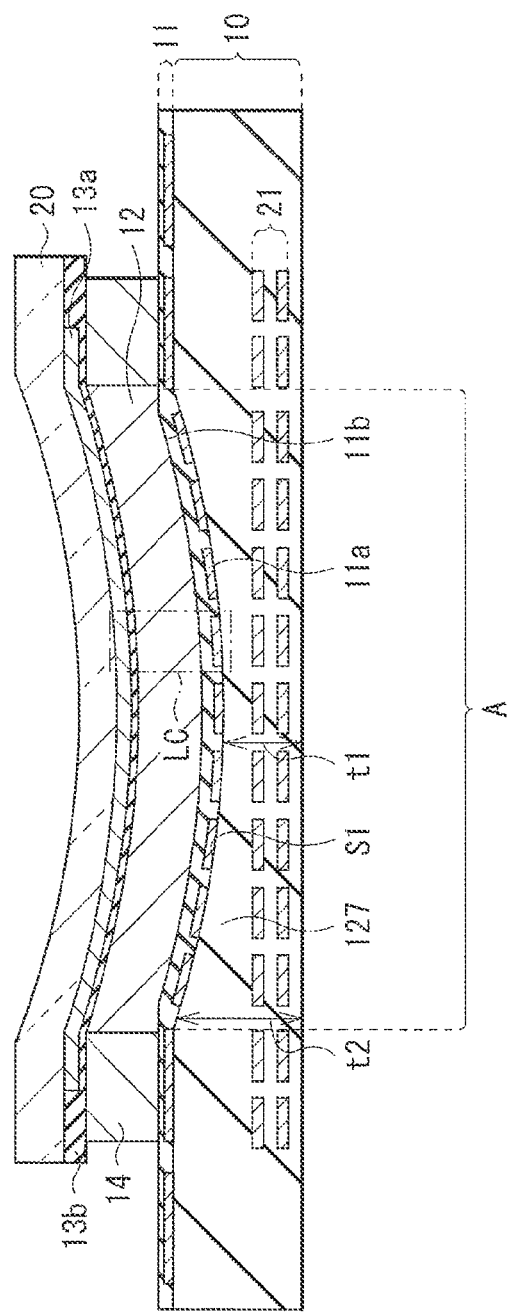

[ FIG. 17 ]
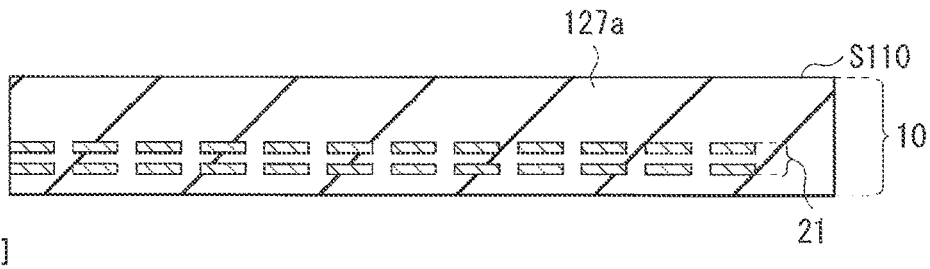
[ FIG. 18A ]
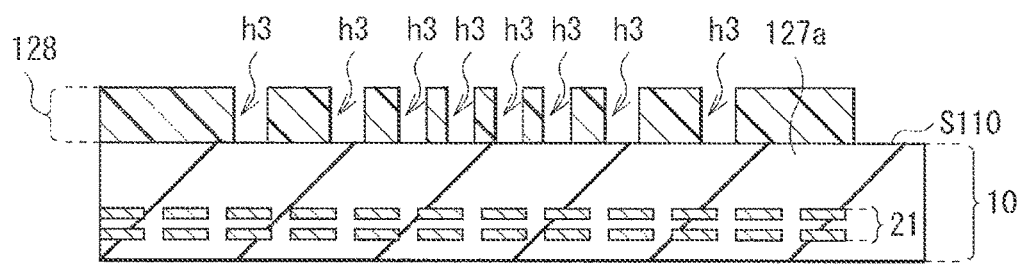
[ FIG. 18B ]
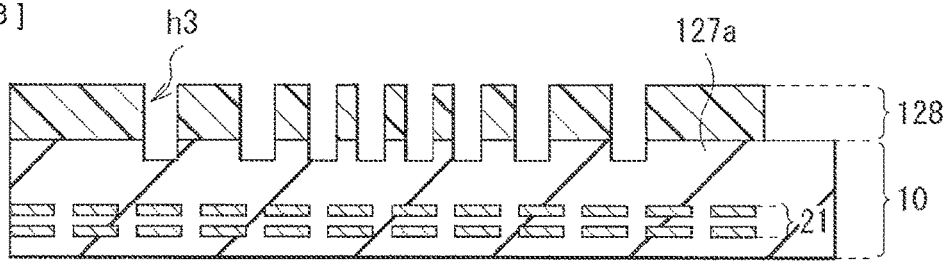
[ FIG. 18C ]
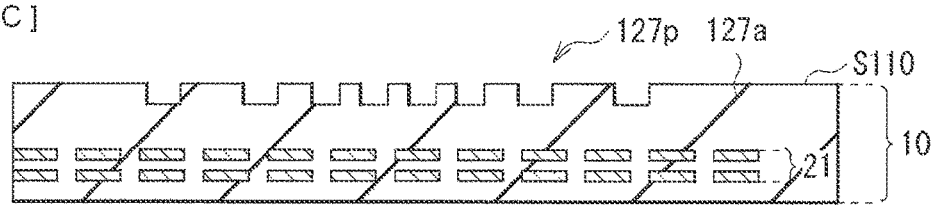
[ FIG. 19 ]
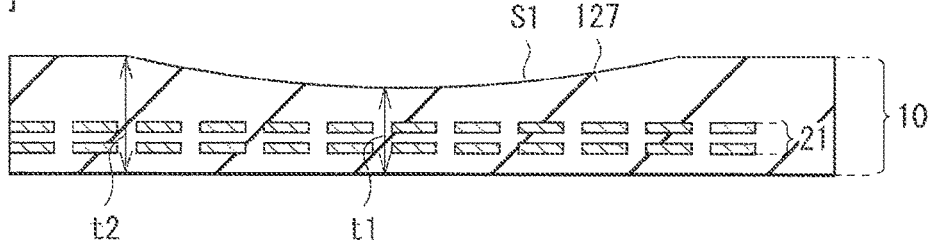

[ FIG. 20 ]
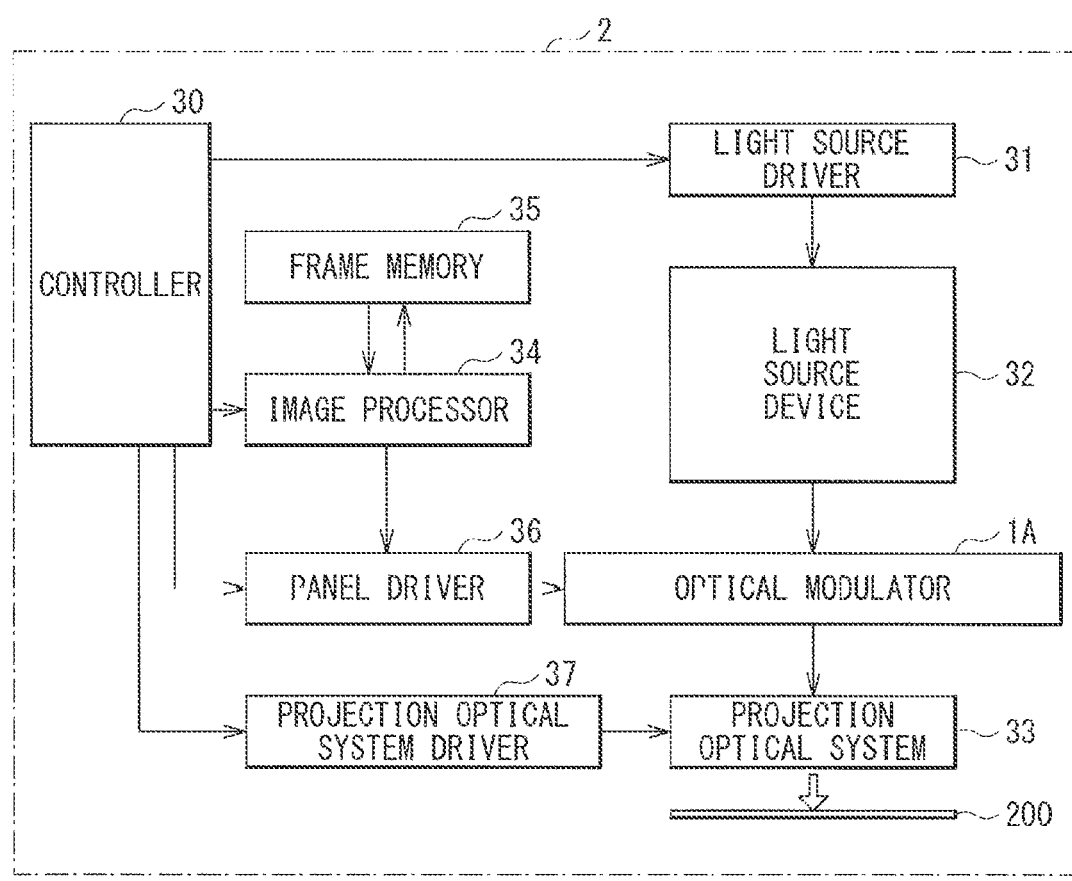

[FIG. 21A]
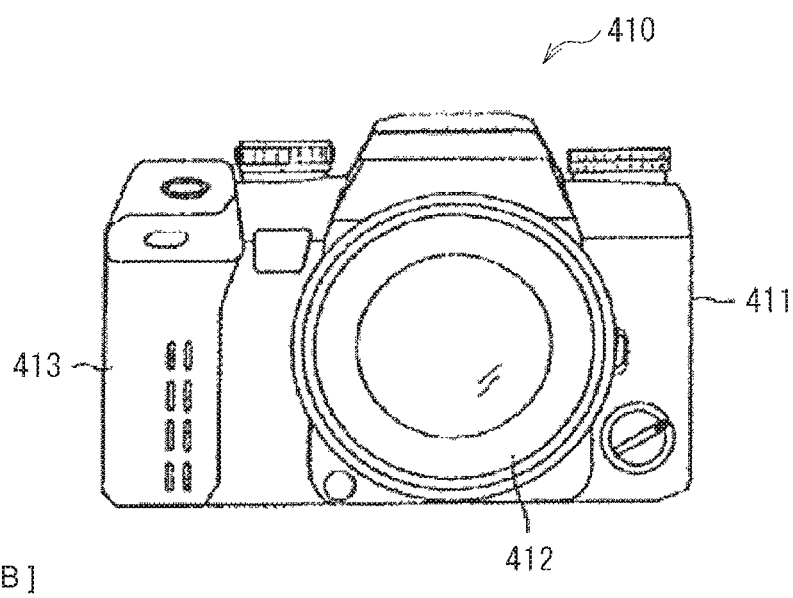
[FIG. 21B]
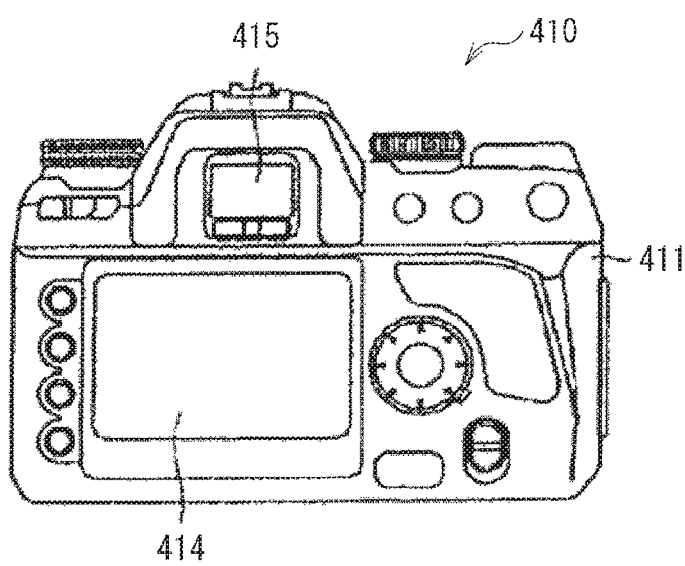

[ FIG. 22 ]
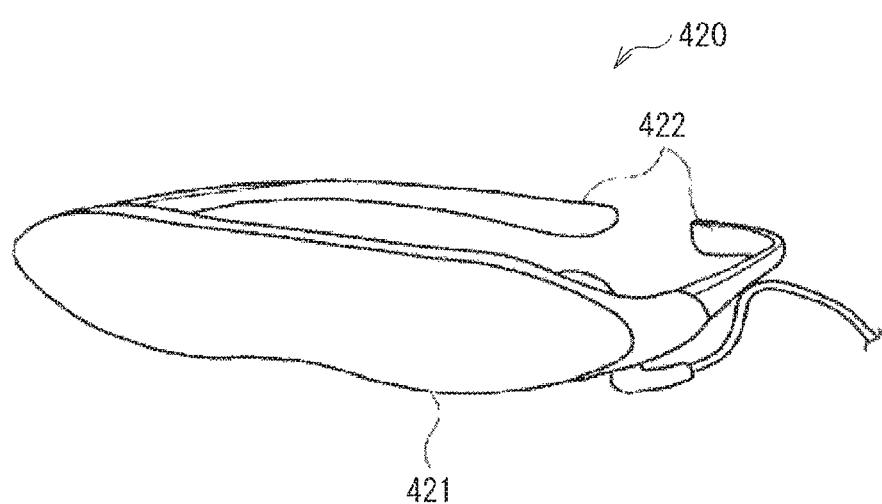

LIQUID CRYSTAL DISPLAY DEVICE AND ELECTRONIC APPARATUS

CROSS REFERENCE TO RELATED APPLICATIONS

This application is a U.S. National Phase of International Patent Application No. PCT/JP2017/001406 filed on Jan. 17, 2017, which claims priority benefit of Japanese Patent Application No. JP 2016-012034 filed in the Japan patent office on Jan. 26, 2016. Each of the above-referenced applications is hereby incorporated herein by reference in its entirety.

TECHNICAL FIELD

The present disclosure relates to a liquid crystal display device using, for example, LCOS (Liquid crystal on silicon), and an electronic apparatus including such a liquid crystal display device.

BACKGROUND ART

In liquid crystal display devices using LCOS technology, a liquid crystal is sealed between a silicon (Si) chip serving as a drive substrate and a counter substrate. In order to secure a uniform thickness (cell gap) in the liquid crystal display devices, various studies and developments have been conducted for the purpose of enhancing planarity of a surface of the silicon chip (refer to PTL 1 and PTL 2, for example).

CITATION LIST

Patent Literature

[PTL 1]
Japanese Unexamined Patent Application Publication No. H08-179377
[PTL 2]
Japanese Unexamined Patent Application Publication No. 2000-194008

SUMMARY

Technical Problem

In the foregoing PTL 1, for example, a dummy pixel region similar to an effective pixel region is provided in a peripheral region to the effective pixel region to achieve an improvement in planarity. Moreover, in PTL 2, a metal pattern is provided in a region below a seal that seals a liquid crystal, and layout density of the metal pattern is controlled, thereby achieving an improvement in planarity.

However, in the liquid crystal display devices mentioned above, the counter substrate may be deformed in a manufacturing process to cause contact between the counter substrate and the drive substrate. Alignment films for liquid crystal alignment are formed on surfaces of the substrates, and such contact may cause damage to the alignment films. This may lead to liquid crystal misalignment, thereby resulting in degradation in display image quality.

It is therefore desirable to provide a liquid crystal display device and an electronic apparatus that make it possible to suppress degradation in display image quality.

[Solution to Problem]

According to an embodiment of the present disclosure, there is provided a liquid crystal display device including: a first substrate including a plurality of wiring layers and having a plurality of first electrodes on one surface of the first substrate; a second substrate provided to face the first substrate and having a second electrode facing the first electrodes; and a liquid crystal layer sealed between the first substrate and the second substrate, wherein a thickness in a peripheral portion in a plane of the first substrate is larger than a thickness in a central portion.

According to an embodiment of the present disclosure, there is provided an electronic apparatus including the foregoing liquid crystal display device according to the embodiment of the present disclosure.

In the liquid crystal display device and the electronic apparatus according to the embodiments of the present disclosure, the thickness in the peripheral portion in the plane of the first substrate including the plurality of wiring layers is larger than the thickness in the central portion. Herein, in a manufacturing process, for example, in some cases, the second substrate may be deformed (curved) by a pressure applied when the first substrate and the second substrate are superposed or by a negative pressure produced when a liquid crystal is sealed. When such deformation causes the second substrate to come into contact with the first substrate, alignment films formed on respective surface (surfaces on liquid crystal layer side) of the first substrate and the second substrate are damaged to cause misalignment of the liquid crystal. The first substrate has a thickness larger in the peripheral portion than in the central portion, which makes it possible to suppress contact between the first and second substrates caused by the above-described deformation of the second substrate. Accordingly, damage to the alignment films is suppressed, and misalignment of the liquid crystal is less prone to occur.

[Advantageous Effects of Invention]

According to the liquid crystal display device and the electronic apparatus of the embodiments of the present disclosure, the thickness in the peripheral portion in the plane of the first substrate including the plurality of wiring layers is larger than the thickness in the central portion, which makes it possible to suppress contact between the first substrate and the second substrate even in a case in which the second substrate is deformed in a manufacturing process, thereby suppressing misalignment of the liquid crystal caused by damage to the alignment films. This makes it possible to suppress degradation in display image quality.

It is to be noted that the above description is merely examples of the embodiments of the present disclosure. Effects of the embodiments of the present disclosure are not limited to effects described here, and may be different from the effects described here or may further include any other effect.

It is to be understood that both the foregoing general description and the following detailed description are exemplary, and are provided to provide further explanation of the technology as claimed.

BRIEF DESCRIPTION OF DRAWINGS

The accompanying drawings are included to provide a further understanding of the technology, and are incorporated in and constitute a part of this specification. The drawings illustrate embodiments and, together with the specification, serve to explain the principles of the technology.

FIG. 1 is a schematic cross-sectional view of a configuration of a liquid crystal display device according to a first embodiment of the present disclosure.

FIG. 2A is a diagram illustrating a relationship between an effective pixel diagonal size and a recessed amount of a drive substrate in the liquid crystal display device illustrated in FIG. 1.

FIG. 2B is a diagram for description of a diagonal size illustrated in FIG. 2A and a concave shape.

FIG. 3 is a circuit diagram illustrating a configuration of a pixel circuit of the liquid crystal display device illustrated in FIG. 1.

FIG. 4A is a diagram illustrating a relationship between a pixel position and wiring density in the liquid crystal display device illustrated in FIG. 1.

FIG. 4B is a diagram illustrating a relationship between the pixel position and the wiring density in the liquid crystal display device illustrated in FIG. 1.

FIG. 5 is a schematic view of stacking order of wiring layers in the drive substrate illustrated in FIG. 1.

FIG. 6 is a plan view of a pixel configuration in a central portion of the drive substrate illustrated in FIG. 1.

FIG. 7 is a plan view of a pixel configuration in a peripheral portion of the drive substrate illustrated in FIG. 1.

FIG. 8 is a cross-sectional view for description of a method of manufacturing the drive substrate illustrated in FIG. 1.

FIG. 9 is a cross-sectional view of a process following a process in FIG. 8.

FIG. 10A is a cross-sectional view of a process following the process in FIG. 9.

FIG. 10B is a cross-sectional view of a process following the process in FIG. 10A.

FIG. 11 is a cross-sectional view of a process following the process in FIG. 10B.

FIG. 12 is a cross-sectional view for description of a method of manufacturing a drive substrate according to a modification example 1.

FIG. 13 is a cross-sectional view of a process following a process in FIG. 12.

FIG. 14 is a cross-sectional view of a process following the process in FIG. 13.

FIG. 15 is a schematic cross-sectional view of a configuration of a liquid crystal display device according to a modification example 2.

FIG. 16 is a schematic cross-sectional view of a configuration of a liquid crystal display device according to a second embodiment of the present disclosure.

FIG. 17 is a cross-sectional view for description of a method of manufacturing a drive substrate illustrated in FIG. 16.

FIG. 18A is a cross-sectional view of a process following a process in FIG. 17.

FIG. 18B is a cross-sectional view of a process following the process in FIG. 18A.

FIG. 18C is a cross-sectional view of a process following the process in FIG. 18B.

FIG. 19 is a cross-sectional view of a process following the process in FIG. 18C.

FIG. 20 is a functional block diagram illustrating an entire configuration of a projection display unit according to an application example 1.

FIG. 21A is a front view of a configuration of a digital single-lens reflex camera according to an application example 2.

FIG. 21B is a back view of a configuration of the digital single-lens reflex camera according to the application example 2.

FIG. 22 is a perspective view of a configuration of a head-mounted display according to an application example 3.

DESCRIPTION OF EMBODIMENTS

Some embodiments of the present disclosure are described in detail below with reference to drawings. It is to be noted that description is given in the following order.

1. First Embodiment (Example of liquid crystal display device including drive substrate with thickness larger in peripheral portion than in central portion by wiring density pattern)
2. Modification Example 1 (Another example of method of manufacturing drive substrate)
3. Modification Example 2 (Example in case in which wiring density of other wiring layer is changed)
4. Second Embodiment (Example of another liquid crystal display device including drive substrate with thickness larger in peripheral region than in central region)
5. Application Examples 1 to 3 (Examples of electronic apparatus)

Configuration

FIG. 1 illustrates a liquid crystal display device (a liquid crystal display device 1) according to a first embodiment of the present disclosure. The liquid crystal display device 1 may be, for example, a reflective display device using LCOS (Liquid crystal on silicon).

The liquid crystal display device 1 may be configured, for example, by sealing a liquid crystal layer 12 between a drive substrate 10 (a first substrate) and a counter substrate 20 (a second substrate). A reflective electrode layer 11 including a plurality of pixel electrodes 11a (first electrodes) is formed on one surface (a surface S1 on side of the liquid crystal layer 12) of the drive substrate 10. A counter electrode 13a (a second electrode) is so formed on one surface (a surface on side of the liquid crystal layer 12) of the counter substrate 20 as to face the reflective electrode layer 11. A periphery of the liquid crystal layer 12 is sealed by a sealing member 14.

The liquid crystal display device 1 has an effective pixel region A including a plurality of pixels. Each of the pixels may include, for example, a liquid crystal element LC, and an FET (field effect transistor) 110 and a retention capacitor Cp that are to be described later. The liquid crystal element LC includes the pixel electrode 11a, and the liquid crystal layer 12 and the counter electrode 13a that are disposed directly above the pixel electrode 11a.

The drive substrate 10 may be configured, for example, by providing a plurality of wiring layers (herein, two wiring layers 15a and 15b) on a substrate made of silicon (Si). In the drive substrate 10, pixel circuits each including a thin film transistor, various wiring lines, and other components are formed over a plurality of layers. Moreover, the wiring layers configuring the pixel circuits are stacked with an interlayer insulating film in between, and a surface of the drive substrate 10 is covered with an insulating film (an insulating film 150). The insulating film 150 corresponds to a specific but non-limiting example of "first insulating film" in an embodiment of the present disclosure.

In the drive substrate 10, a thickness t2 in a peripheral portion in a plane is larger than a thickness t1 in a central portion. Specifically, the surface S1 of the drive substrate 10 has a concave shape at least in the effective pixel region A (the surface S1 is recessed in the effective pixel region A).

More specifically, the surface S1 of the drive substrate 10 is curved (or is inclined from the central portion toward the peripheral portion) in the effective pixel region A, which causes a thickness of the drive substrate 10 to slightly increase from the central portion to the peripheral portion. The reflective electrode layer 11 is formed on the surface S1. However, the shape of the surface S1 of the drive substrate 10 is not limited to a slightly curved or inclined shape. It is only necessary for the surface S1 to have a concave shape in which the thickness t2 in the peripheral portion of the drive substrate 10 is larger than the thickness t1 in the central portion. For example, the thickness of the drive substrate 10 may change in a stepwise fashion from the peripheral portion to the central portion.

FIG. 2A illustrates a relationship between a size of the effective pixel region A (an effective pixel diagonal size) and a recessed amount (arbitrary unit) of the surface S1. Herein, as the effective pixel size increases, the amount of a liquid crystal injected into the liquid crystal layer 12 in a manufacturing process increases. This causes an increase in expansion force of the liquid crystal layer 12, and a deformation amount of the counter substrate 20 decreases with the increase in expansion force of the liquid crystal layer 12. The recessed amount of the surface S1 may be preferably set in accordance with the deformation amount of the counter substrate 20, i.e., the effective pixel size. To give an example, a recessed amount (a value corresponding to a difference between the thicknesses t1 and t2) in a case in which the effective pixel diagonal size is a 0.6-type may be ideally 1, and a recessed amount in a case in which the effective pixel diagonal size is a 0.3-type may be ideally 0.5. Moreover, it may be desirable to form the concave shape of the surface S1 along both a short-side direction and a long-side direction at least in the effective pixel region A of the drive substrate 10, as illustrated in FIG. 2B.

It is to be noted that a surface opposite to the surface S1 of the drive substrate 10 may be flat, for example. Moreover, the counter substrate 20 herein is entirely curved along the shape of the surface S1 of the drive substrate 10. This makes it possible to secure a uniform cell gap in the effective pixel region. Note that the counter substrate 20 may have a flat plate shape. Moreover, a recessed amount (a deformation amount) in the curved shape of the counter substrate 20 may be equal to or different from the recessed amount (a value corresponding to a difference between the thicknesses t1 and t2) of the surface S1.

The reflective electrode layer 11 is a layer including the plurality of pixel electrodes 11a. One of the pixel electrodes 11a is provided to each pixel, and the pixel electrodes 11a may include a metal having high reflectivity such as aluminum (Al). For example, an alignment film 11b may be formed on surfaces of the pixel electrodes 11a. The alignment film 11b may be so formed as to cover a top surface of each of the pixel electrodes 11a and to fill a region between the pixel electrodes 11a. The alignment film 11b may be an inorganic alignment film, for example. The alignment film 11b is subjected to alignment treatment in accordance with a drive mode of the liquid crystal layer 12.

The liquid crystal layer 12 includes a liquid crystal that changes transmittance of light passing therethrough by application of a voltage through the pixel electrode 11a and the counter electrode 13a. The kind (drive mode) of the liquid crystal used for the liquid crystal layer 12 is not particularly limited. Non-limiting examples of the liquid crystal may include a VA (Vertical alignment) liquid crystal and a TN (Twisted Nematic) liquid crystal.

A thickness (cell gap) of the liquid crystal layer 12 may be within a range from about 1 fÊm to about 5 fÊm both inclusive. The liquid crystal layer 12 may be interposed between the drive substrate 10 and the counter substrate 20 without using a spacer, for example. In other words, in the liquid crystal display device 1, the counter substrate 20 and the drive substrate 10 are superposed on each other without a spacer. The sealing member 14 formed around the liquid crystal layer 12 may include an ultraviolet curable resin, for example.

The counter electrode 13a may be formed, for example, in the entirety of the effective pixel region A, and serves as a common electrode for the respective pixels. The counter electrode 13a may be configured of, for example, a transparent conductive film made of ITO (indium tin oxide). For example, an alignment film 13b may be formed on a surface of the counter electrode 13a. The alignment film 13b may be an inorganic alignment film, for example. The alignment film 13b is subjected to alignment treatment in accordance with the drive mode of the liquid crystal layer 12.

The counter substrate 20 may include, for example, a glass substrate. In the counter substrate 20, a color filter may be formed in addition to the counter electrode 13a and the alignment film 13b mentioned above. In a case in which the liquid crystal display device 1 displays a single color, a color filter of one of red (R), green (G), and blue (B) may be provided, for example. Alternatively, in a case in which the liquid crystal display device displays three primary colors, color filters of R, G, and B are provided in a predetermined arrangement.

(Specific Configuration of Drive Substrate 10)

FIG. 3 illustrates a configuration of the pixel circuit of the liquid crystal display device 1. It is to be noted that FIG. 3 illustrates a region corresponding to four pixels P. The pixels (pixels P) each include the liquid crystal element LC, the retention capacitor Cp, and the FET 110, as illustrated in FIG. 3. A scanning line GL and a signal line DL are coupled to each of the pixels P. The scanning line GL may be coupled to, for example, a gate of the FET 110, and is a wiring line adapted to supply a scanning signal from an unillustrated scanning line drive circuit to the FET 110 at a predetermined timing. The signal line DL is a wiring line adapted to supply a signal based on an image signal inputted from outside, from a signal line drive circuit to each of the pixels P. It is to be noted that the scanning line drive circuit and the signal line drive circuit are formed in or coupled to a peripheral region to the effective pixel region A. The pixel circuit is formed over a plurality of layers in the drive substrate 10.

In the present embodiment, one wiring layer (the wiring layer 15a) of the plurality of wiring layers is provided at predetermined layout density (wiring density). The wiring layer 15a may be, for example, an uppermost wiring layer of the wiring layers formed in the drive substrate 10, and may be made of, for example, a metal such as aluminum and copper (Cu). In the present embodiment, a thickness of the insulating film 150 formed on the wiring layer 15a is larger in the peripheral portion than in the central portion. A surface of the insulating film 150 may form, for example, the surface S1, and a concave shape corresponding to a layout pattern of the wiring layer 15a is formed in the surface S1. The insulating film 150 may include silicon oxide ($SiO_2$), for example.

FIGS. 4A and 4B each illustrate an example of a relationship between a pixel position and wiring density. Layout density in the peripheral portion is designed to be higher than layout density in the central portion, as illustrated in FIGS. 4A and 4B. As a pattern of change of the layout density, the layout density may slightly change as illustrated in FIG. 4A, or may change in a stepwise fashion as illustrated in FIG. 4B. However, the layout density may preferably change slightly as illustrated in FIG. 4A. This makes it possible to reduce an influence of processing variation by an apparatus in a CMP process to be described later and to form a slightly curved shape, thereby improving uniformity. Moreover, a layout density difference dl between the central portion and the peripheral portion may be desirably about 5% or more.

FIGS. 5 to 7 each illustrate an example of the pixel circuit having the wiring layer 15a as described above. FIG. 5 is a schematic view for description of a stacking configuration of the respective wiring layers provided in the drive substrate 10. FIG. 6 illustrates a pixel configuration in the central portion of the effective pixel region A, and FIG. 7 illustrates a pixel configuration in the peripheral portion.

In the drive substrate 10, a semiconductor layer (a Si diffusion layer 111) of the FET 110, a gate electrode 110G, the scanning line GL, and the signal line DL are stacked in order from a silicon substrate, as illustrated in FIG. 5. Interlayer coupling between the respective wiring layers is made through vias V1, V2, and V3. In this stacking configuration, a source electrode 110S and a drain electrode 110D forming the FET 110 are provided in the same layer as the scanning line GL. Moreover, the retention capacitor Cp is formed in the same layer as the gate electrode 110G and the Si diffusion layer 111.

The wiring layer 15a may be provided, for example, in a layer (herein, the same layer as the signal line DL) between the FET 110 and the pixel electrode 11a, and is electrically coupled to the pixel electrode 11a through the via V1. In the wiring layer 15a, wiring density in the peripheral portion may be higher than wiring density in the central portion as illustrated in FIGS. 6 and 7. More specifically, an interval between wiring lines (wiring lines 15a2) provided in the peripheral portion may be smaller than an interval between wiring lines (wiring lines 15a1) provided in the central portion, and an area occupied by the wiring lines in the peripheral portion may be larger than an area occupied by the wiring lines in the central portion. In particular, although not illustrated, an interval between the wiring lines or an area occupied by the wiring lines in a region between the central portion and the peripheral portion may be designed to change gradually or in a stepwise fashion from the central portion to the peripheral portion.

It is to be noted that layouts illustrated in FIGS. 6 and 7 are merely examples, and layouts of respective components including the wiring lines 15a1 and 15a2 are not limited thereto. The planar shape of each of the wiring lines 15a1 and 15a2 is not limited to a rectangular shape illustrated in FIGS. 6 and 7, and may be any other shape. Moreover, in the wiring layer 15a, one wiring line (the wiring line 15a1 or 15a2) is provided for each of the pixels; however, a plurality of wiring lines (that may include a dummy wiring line) may be provided in each of the pixels.

(Method of Manufacturing Drive Substrate 10)

The drive substrate 10 as described above may be formed as follows, for example. FIGS. 8, 9, 10A, 10B, and 11 are cross-sectional views for description of processes of manufacturing the drive substrate 10. It is to be noted that these drawings selectively illustrate only a region corresponding to two pixels in the peripheral portion and a region corresponding to two pixels in the central portion.

First, a plurality of FETs 110 are formed in a selective region on the substrate 120 made of, for example, silicon with use of various kinds of thin film processes, as illustrated in FIG. 8.

Subsequently, the wiring layer 15a (the wiring lines 15a1 and 15a2) made of the above-described material (for example, aluminum) is formed. More specifically, an interlayer insulating film 121 is formed to cover the FETs 110, as illustrated in FIG. 9. Thereafter, a film of aluminum is formed with use of, for example, a sputtering method, and then the wiring line 15a2 and the wiring line 15a1 are respectively formed in the peripheral portion and the central portion with use of a photolithography method and etching. Each of the wiring lines 15a1 and 15a2 is electrically coupled to corresponding one therebelow of the FETs 110 through a via 122 (corresponding to the via V2 in FIGS. 5 to 7) formed in the interlayer insulating film 121.

Next, the insulating film 150 (insulating films 123 and 124) is formed on the wiring lines 15a1 and 15a2. First, the insulating film 123 made of, for example, $SiO_2$ is formed with a predetermined thickness with use of, for example, HDP (High Density Plasma) technology to cover the wiring lines 15a1 and 15a2, as illustrated in FIG. 10A. Accordingly, the insulating film 123 is formed while a difference in level caused by the wiring lines 15a1 and 15a2 remains. Subsequently, the insulating film 124 made of, for example, $SiO_2$ is formed by, for example, a plasma CVD (Chemical Vapor Deposition) method, as illustrated in FIG. 10B. The thus-formed insulating film 124 has a thickness larger in the peripheral portion having high wiring density than in the central portion having low wiring density.

Thereafter, part on surface side of the insulating film 124 is removed with use of, for example, CMP (Chemical Mechanical Polishing). This causes a thickness t12 in the peripheral portion of the insulating film 124 to be larger than a thickness t11 in the central portion of the insulating film 124, as illustrated in FIG. 11. Thus, the insulating film 150 having a thickness different in the peripheral portion and the central portion is formed. In other words, the surface S1 having a concave shape is formed in the drive substrate 10. Thus, the drive substrate 10 is formed.

Effects

In the liquid crystal display device 1 according to the present embodiment, a voltage corresponding to an image signal is applied to the liquid crystal layer 12 in each of the pixels through the pixel electrode 11a and the counter electrode 13a. This causes transmittance of the liquid crystal layer 12 to change for each of the pixels. Light having entered from the counter substrate 20 is reflected by the reflective electrode layer 11, and thereafter, the reflected light is modulated in each of the pixels while passing through the liquid crystal layer 12. The thus-modulated light is displayed as an image.

Herein, in such a liquid crystal display device 1, the drive substrate 10 and the counter substrate 20 are pressurized when being superposed in a manufacturing process. Moreover, when a liquid crystal is sealed between the drive substrate 10 and the counter substrate 20 to from the liquid crystal layer 12, a negative pressure is produced. Under such pressures, the counter substrate 20 is deformed (curved), and in some cases, such deformation may cause the counter substrate 20 to come into contact with the drive substrate 10. As a result, the alignment films formed on the surface of the drive substrate 10 and the surface of the counter substrate 20 (the surfaces on side of the liquid crystal layer 12) are damaged to cause misalignment of the liquid crystal.

On this point, in the present embodiment, the drive substrate 10 has a thickness larger in the peripheral portion than in the central portion, more specifically, the surface S1 of the drive substrate 10 has a concave shape, which makes it possible to keep the counter substrate 20 from contact with the drive substrate 10 even in a case in which the counter substrate 20 is deformed as described above. Thus, damage to the alignment films 11b and 13b is suppressed, and misalignment of the liquid crystal is less prone to occur.

As described above, in the present embodiment, the thickness t2 in the peripheral portion in the plane of the drive substrate 10 is larger than the thickness t2 in the central portion. Thus, even in a case in which the counter substrate 20 is deformed in a manufacturing process, it is possible to suppress contact between the drive substrate 10 and the counter substrate 20, thereby suppressing misalignment of the liquid crystal caused by damage to the alignment films. This makes it possible to suppress degradation in display image quality.

Next, description is given of modification examples of the foregoing first embodiment and other embodiments. In the following, substantially same components as those in the foregoing first embodiment are denoted with same reference numerals, and any redundant description thereof is omitted.

MODIFICATION EXAMPLE 1

FIGS. 12 to 14 are diagrams for description of a method of manufacturing a drive substrate according to a modification example 1. In the foregoing first embodiment, in the method of manufacturing the drive substrate 10, the wiring layer 15a made of aluminum is formed with predetermined wiring density, and thereafter, an insulating film formed on the wiring layer 15a is polished by CMP to form the concave shape. In the modification example, description is given of a technique of forming a concave shape with use of a so-called damascene process, for example, in a case in which the wiring layer 15a is made of, for example, copper.

More specifically, first, grooves H1 and H2 are respectively formed in the central portion and the peripheral portion on a top surface of the insulating film 125 as illustrated in FIG. 12. Widths of the grooves H1 and H2 are different from each other. Subsequently, a metal layer 126 made of copper is formed by, for example, a sputtering method to fill in the grooves H1 and H2, as illustrated in FIG. 13. Thereafter, part of the metal layer 126 is removed from surface side with use of, for example, CMP. Thus, the wiring layer 15a is so formed as to be embedded in the insulating film 125, and a thickness t22 in the peripheral portion is larger than a thickness t21 in the central portion. Forming the insulating film 150 on the insulating film 125 and the wiring layer 15a makes it possible to form the surface of the insulating film 150 in a concave shape. In other words, it is possible to form the surface S1 having a concave shape in the drive substrate 10.

MODIFICATION EXAMPLE 2

FIG. 15 illustrates a configuration of a liquid crystal display device according to a modification example 2. The foregoing first embodiment involves an example in which the wiring layer 15a is provided in an uppermost layer of the drive substrate 10; however, the wiring layer 15a may not be necessarily provided in the uppermost layer. For example, in the present modification example, the wiring layer 15a is the second wiring layer from the top of the wiring layers provided in the drive substrate 10.

In the present modification example, a concave shape corresponding to a pattern of the wiring density of the wiring layer 15a is formed in an interlayer insulating film 151 formed on the wiring layer 15a by a similar technique to that in the foregoing first embodiment. A wiring layer 15c and the insulating film 150 are formed in order on a top surface of the interlayer insulating film 151 to form a concave shape in the surface S1 of the drive substrate 10.

It is to be noted that, in the present modification example, the second wiring layer from the top is formed with predetermined wiring density as the wiring layer 15a; however, in a case in which the drive substrate 10 includes three or more wiring layers, any of the third and later wiring layers from the top may have the above-described wiring density (any of the third and later wiring layers from the top may serve as the wiring layer 15a). Further, a plurality of wiring layers 15a having the above-described wiring density may be formed.

SECOND EMBODIMENT

FIG. 16 illustrates a configuration of a liquid crystal display device according to a second embodiment of the present disclosure. The liquid crystal display device may be, for example, a reflective display device using LCOS (liquid crystal on silicon), as with the liquid crystal display device 1 of the foregoing first embodiment. Moreover, the liquid crystal layer 12 is sealed between the drive substrate 10 and the counter substrate 20. The reflective electrode layer 11A including the plurality of pixel electrode 11a is formed on one surface (the surface S1 on side of the liquid crystal layer 12) of the drive substrate 10. The counter electrode 13a is so formed on one surface (a surface on side of the liquid crystal layer 12) of the counter substrate 20 as to face the reflective electrode layer 11. A periphery of the liquid crystal layer 12 is sealed by the sealing member 14.

Moreover, in the drive substrate 10, a plurality of wiring layers (wiring layers 21) may be provided on a substrate made of, for example, silicon. In the wiring layers 21, a pixel circuits each including a thin film transistor, various wiring lines, and other components are stacked with an interlayer insulating film in between. An insulating film 127 is formed on the wiring layers 21. In other words, the surface of the drive substrate 10 is covered with the insulating film 127. The insulating film 127 corresponds to a specific but non-limiting example of "second insulating film" in an embodiment of the present disclosure.

In the drive substrate 10, as with the foregoing first embodiment, the thickness t2 in the peripheral portion in the plane is larger than the thickness t1 in the central portion. Specifically, the surface S1 of the drive substrate 10 (a surface of the insulating film 127) has a concave shape in the effective pixel region A. This causes the thickness of the drive substrate 10 to slightly increase from the central portion to the peripheral portion. The reflective electrode layer 11 is formed on the surface S1.

However, in the present embodiment, it is designed to form a flat interlayer insulating film on the wiring layers 21 by providing, for example, a dummy wiring line in the wiring layers 21. In other words, unlike the first embodiment, a difference in in-plane wiring density in the wiring layer 21 is reduced to form the interlayer insulating film in a surface shape as flat as possible. Thereafter, the surface of the insulating film 127 formed on surface side of the drive substrate 10 is processed to have a concave shape, which makes it possible to form the drive substrate 10 having the surface S1 similar to that in the foregoing first embodiment.

More specifically, the drive substrate 10 is formed as follows. First, a layout of the wiring density of the wiring layer 21 and other layouts are appropriately designed as illustrated in FIG. 17 to form an insulating film 127a having a flat surface (having a flat surface S110) on the wiring layer 21.

Subsequently, a photoresist film 128 having a predetermined pattern is formed on the surface S110 of the insulating film 127a. In the photoresist film 128, layout density of openings h3 in the central portion is different from that in the peripheral portion. More specifically, the layout density of the openings h3 gradually decreases from the peripheral portion to the central portion. For example, dry etching is performed with use of the photoresist film 128 having such a pattern as a mask, as illustrated in FIG. 18B, to remove a selective region of the surface of the insulating film 127a. Thereafter, the photoresist film 128 is removed to form, on the surface of the insulating film 127a, a concave pattern 127p having similar layout density to the layout density of the openings h3 of the photoresist film 128, as illustrated in FIG. 18C.

Thereafter, the surface S110 of the insulating film 127a in which the concave pattern 127p is formed is removed by, for example, CMP to form the surface S1 having a concave shape, as illustrated in FIG. 19.

Even in the present embodiment, as with the foregoing first embodiment, the thickness t2 in the peripheral portion in the plane of the drive substrate 10 is larger than the thickness t1 in the central portion. This makes it possible to suppress contact between the drive substrate 10 and the counter substrate 20 and suppress misalignment of the liquid crystal caused by damage to the alignment films even in a case in which the counter substrate 20 is deformed in a manufacturing process. Thus, similar effects to those in the foregoing first embodiment are achievable.

Next, description is given of application examples of the liquid crystal display devices according to the foregoing embodiments and modification examples. The liquid crystal display devices according to the foregoing embodiments and examples are applicable to various electronic apparatuses. Any of the liquid crystal display devices may be mounted in, for example, a projector (a projection display unit), a viewfinder of a camera, and a head-mounted display, as described below.

APPLICATION EXAMPLE 1

FIG. 20 is a functional block diagram illustrating an entire configuration of a projection display unit (a projection display unit 2) according to an application example 1. The projection display unit 2 may be, for example, a display unit that projects an image on a screen 200 (a projection surface). The projection display unit 2 may be coupled to an external image supplier through an interface (I/F), and may perform projection on the screen 200 on the basis of an image signal inputted to the I/F. Non-limiting examples of the external image supplier may include computers such as personal computers and various kinds of image players.

The projection display unit 2 may include, for example, a light source driver 31, a light source device 32, an optical modulator 1A, a projection optical system 33, an image processor 34, a frame memory 35, a panel driver 36, a projection optical system driver 37, and a controller 30.

The light source driver 31 outputs a pulse signal for control of a light emission timing of a light source provided in the light source device 32. The light source driver 31 may include, for example, a PWM setter, a PWM signal generator, a limiter, and other components that are not illustrated, and controls a light source driver of the liquid crystal display device 1 on the basis of control by the controller 30 to perform PWM control of the light source, thereby turning on or off the light source or adjusting luminance.

The light source device 32 may include, for example, a light source, a light source driver, and a current value setter. The light source driver drives the light source, and the current value setter sets a current value when driving the light source. The light source driver generates a pulse current having a current value set by the current value setter in synchronization with a pulse signal inputted from the light source driver 31 on the basis of power supplied from an unillustrated power source circuit. The generated pulse current is supplied to the light source.

The optical modulator 1A modulates light (illumination light) outputted from the light source device 32 on the basis of the image signal to generate image light. The optical modulator 1A may include one or more reflective liquid crystal devices. Any of the liquid crystal display devices of the foregoing embodiments and examples is applied to the optical modulator 1A. The optical modulator 1A may include, for example, a liquid crystal panel that modulates blue light, a liquid crystal panel that modulates red light, and a liquid crystal panel that modulate green light. Color light of R, color light of G, and color light of B that are modulated by the optical modulator 1A may be combined by, for example, a cross dichroic prism to be guided to the projection optical system 33.

The projection optical system 33 may include, for example, a lens group that projects the light modulated by the optical modulator 1A on the screen 200 to form an image.

The image processor 34 acquires the image signal inputted from outside, and may perform, for example, determination of an image size, determination of resolution, and determination of a still image or a moving image. In a case with the moving image, the image processor 34 may also determine, for example, an image data attribute such as a frame rate. Moreover, in a case in which the resolution of the acquired image signal is different from display resolution of each of the liquid crystal panels of the optical modulator 1A, the image processor 34 performs resolution conversion. The image processor 34 develops the image having been subjected to these processes in the frame memory 35 for each frame, and outputs, to the panel driver 36, the image developed in the frame memory 35 for each frame as a display signal.

The panel driver 36 drives each of the liquid crystal panels of the optical modulator 1A. The panel driver 36 drives each of the liquid crystal panels to change transmittance of light through each of the pixels provided in each of the liquid crystal panels, thereby forming an image.

The projection optical system driver 37 includes a motor that drives a lens provided in the projection optical system 33. The projection optical system driver 37 may drive, for example, the projection optical system 33 in accordance with control by the controller 30 to perform adjustment such as zoom adjustment, focus adjustment, and diaphragm adjustment.

The controller 30 controls the light source driver 31, the image processor 34, the panel driver 36, and the projection optical system driver 37.

APPLICATION EXAMPLE 2

FIGS. 21A and 21B each illustrate an appearance of a digital single-lens reflex camera 410. The digital single-lens reflex camera 410 may include, for example, a main body 411, a lens 412, a grip 413, a display section 414, and a viewfinder 415. Any of the liquid crystal display devices of the foregoing embodiments and examples is mounted in the display section 14 or the viewfinder 415.

APPLICATION EXAMPLE 3

FIG. 22 illustrates an appearance of a head-mounted display 420. The head-mounted display 420 may include an eyeglass display section 421 and a support 422. Any of the liquid crystal display devices of the foregoing embodiments and examples is mounted in the display section 421.

Although description has been made by giving the example embodiments and the modification examples as mentioned above, the contents of the present disclosure are not limited to the above-mentioned example embodiments and modification examples and may be modified in a variety of ways. For example, the position, shape, and number of each of the components of the liquid crystal display devices described in the foregoing example embodiments and examples are merely examples, and all of the components may not be necessarily provided, and other components may be further provided.

It is to be noted that the present disclosure may have the following configurations.

(1) A liquid crystal display device, including:
a first substrate including a plurality of wiring layers and having a plurality of first electrodes on one surface of the first substrate;
a second substrate provided to face the first substrate and having a second electrode facing the first electrodes; and
a liquid crystal layer sealed between the first substrate and the second substrate,
wherein a thickness in a peripheral portion in a plane of the first substrate is larger than a thickness in a central portion.

(2) The liquid crystal display device according to (1), wherein a surface on the liquid crystal layer side of the first substrate has a concave shape.

(3) The liquid crystal display device according to (2), wherein
a plurality of pixels are provided, and
the concave shape is formed in an effective pixel region.

(4) The liquid crystal display device according to (2), wherein the concave shape is a shape slightly curved from the peripheral portion to the central portion.

(5) The liquid crystal display device according to any one of (1) to (4), wherein layout density of a first wiring layer of the wiring layers is higher in the peripheral portion than in the central portion.

(6) The liquid crystal display device according to (5), wherein the first wiring layer is an uppermost wiring layer of the wiring layers.

(7) The liquid crystal display device according to (5) or (6), wherein
a field effect transistor is provided for each of the first electrodes in the wiring layers, and
the first wiring layer is provided in a layer between the field effect transistors and the first electrodes.

(8) The liquid crystal display device according to any one of (5) to (7), wherein
the first substrate has a first insulating film on the first wiring layer, and
a thickness of the first insulating film is larger in the peripheral portion than in the central portion.

(9) The liquid crystal display device according to any one of (5) to (8), wherein layout density of the first wiring layer changes from the central portion to the peripheral portion in a stepwise fashion or slightly.

(10) The liquid crystal display device according to any one of (5) to (9), wherein in the first wiring layer, an interval between wiring lines in the peripheral portion is smaller than an interval between wiring lines in the central portion.

(11) The liquid crystal display device according to any one of (5) to (10), wherein in the first wiring layer, an area occupied by wiring lines in the peripheral portion is larger than an area occupied by wiring lines in the central portion.

(12) The liquid crystal display device according to any one of (1) to (11), wherein
a second insulating film is provided on the one or more wiring layers, and
the second insulating film has a thickness larger in the peripheral portion than in the central portion.

(13) The liquid crystal display device according to any one of (1) to (12), wherein
the first electrode is a reflective electrode, and
the second electrode is a transparent electrode.

(14) The liquid crystal display device according to any one of (1) to (13), wherein
the first substrate includes a silicon (Si) substrate, and
the second substrate includes a glass substrate.

(15) An electronic apparatus provided with a liquid crystal display device, the liquid crystal display device including:
a first substrate including a plurality of wiring layers and having a plurality of first electrodes on one surface of the first substrate;
a second substrate provided to face the first substrate and having a second electrode facing the first electrodes; and
a liquid crystal layer sealed between the first substrate and the second substrate,
wherein a thickness in a peripheral portion in a plane of the first substrate is larger than a thickness in a central portion.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST 1 liquid crystal display device
10 drive substrate
11 reflective electrode layer
11a pixel electrode
11b, 13b alignment film
12 liquid crystal layer
13a counter electrode
14 sealing member
15a, 15b, 15c, 21 wiring layer
15a1, 15a2 wiring line
20 counter substrate
110 FET
150 insulating film
1A optical modulator
2 projection display unit
A effective pixel region
S1 surface
t1, t2, t11, t12, t21, t22 thickness

The invention claimed is:

1. A liquid crystal display device, comprising:
   a first substrate that includes a plurality of wiring layers and a plurality of first electrodes on a first surface of the first substrate, wherein
       a specific wiring layer of the plurality of wiring layers includes wiring lines, and
       a layout density of the wiring lines in the specific wiring layer is higher in a peripheral portion of the first substrate than in a central portion of the first substrate;
   a second substrate that faces the first substrate, wherein the second substrate includes a second electrode that faces the plurality of first electrodes; and
   a liquid crystal layer between the first substrate and the second substrate, wherein a first thickness of the peripheral portion of the first substrate is greater than a second thickness of the central portion of the first substrate.

2. The liquid crystal display device according to claim 1, wherein a shape of the first surface of the first substrate is a concave shape.

3. The liquid crystal display device according to claim 2, further comprises an effective pixel region that includes a plurality of pixels, wherein the effective pixel region includes the concave shape of the first surface.

4. The liquid crystal display device according to claim 3, wherein the effective pixel region includes the first thickness and the second thickness.

5. The liquid crystal display device according to claim 2, wherein the concave shape of the first substrate extends from the peripheral portion of the first substrate to the central portion of the first substrate.

6. The liquid crystal display device according to claim 3, wherein
   an amount of recess at a center of the effective pixel region is based on an effective pixel diagonal size;
   the amount of recess corresponds to a difference between the first thickness and the second thickness, and
   the effective pixel diagonal size corresponds to a size of the effective pixel region.

7. The liquid crystal display device according to claim 1, wherein the specific wiring layer is an uppermost wiring layer among the plurality of wiring layers.

8. The liquid crystal display device according to claim 1, further comprising a plurality of field effect transistors coupled to at least one of the plurality of first electrodes, wherein the specific wiring layer is between the plurality of field effect transistors and the at least one of the plurality of first electrodes.

9. The liquid crystal display device according to claim 1, further comprising:
   a first insulating film on the specific wiring layer; and
   a second insulating film on the first insulating film, wherein a third thickness of the second insulating film in the peripheral portion of the first substrate is greater than a fourth thickness of the second insulating film in the central portion of the first substrate.

10. The liquid crystal display device according to claim 1, wherein the layout density of the wiring lines changes from the central portion of the first substrate to the peripheral portion of the first substrate in a stepwise fashion.

11. The liquid crystal display device according to claim 1, wherein the layout density of the wiring lines changes from the central portion of the first substrate to the peripheral portion of the first substrate gradually.

12. The liquid crystal display device according to claim 1, wherein an interval between the wiring lines in the peripheral portion of the first substrate is smaller than an interval between the wiring lines in the central portion of the first substrate.

13. The liquid crystal display device according to claim 1, wherein an area associated with the wiring lines in the peripheral portion of the first substrate is larger than an area associated with the wiring lines in the central portion of the first substrate.

14. The liquid crystal display device according to claim 1, further comprising an insulating film on the specific wiring layer of the plurality of wiring layers, wherein a third thickness of the insulating film in the peripheral portion of the first substrate is greater than a fourth thickness of the insulating film in the central portion of the first substrate.

15. The liquid crystal display device according to claim 1, wherein
   each of the plurality of the first electrodes is a reflective electrode, and
   the second electrode is a transparent electrode.

16. The liquid crystal display device according to claim 1, wherein
   the first substrate comprises silicon (Si), and
   the second substrate comprises a glass.

17. An electronic apparatus, comprising:
   a liquid crystal display device that includes:
       a first substrate that includes a plurality of wiring layers and a plurality of first electrodes on a first surface of the first substrate, wherein
           a specific wiring layer of the plurality of wiring layers includes wiring lines, and
           a layout density of the wiring lines in the specific wiring layer is higher in a peripheral portion of the first substrate than in a central portion of the first substrate;
       a second substrate that faces the first substrate, wherein the second substrate includes a second electrode that faces the plurality of first electrodes; and
       a liquid crystal layer between the first substrate and the second substrate, wherein a first thickness in the peripheral portion of the first substrate is larger than a second thickness in the central portion of the first substrate.

18. The liquid crystal display device according to claim 1, further comprising:
   a first alignment film on the plurality of first electrodes; and
   a second alignment film on the second electrode, wherein the second alignment film is different from the first alignment film.

* * * * *